2,776,962
ACID MONOAZO DYESTUFFS

Franz Frisch, Arlesheim Basel-Land, near Basel, and Markus Kappeler, Basel, Switzerland, assignors to Sandoz A. G., Basel, Switzerland, a Swiss firm No Drawing. Application July 6, 1954,
Serial No. 441,645

Claims priority, application Switzerland July 7, 1953

6 Claims. (Cl. 260—198)

The present invention relates to acid monoazo dyestuffs. In accordance with the present invention, valuable monoazo dyestuffs are obtained when diazotized 1-amino-4-phenoxybenzene-2-sulfonic acids of the formula

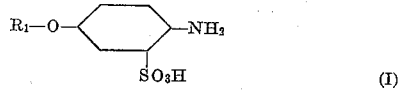

wherein $R_1$ is a phenyl radical, which may be substituted by one or more halogen atoms, alkyl, cycloalkyl, aralkyl, aryl and/or alkoxy groups, or a 5,6,7,8-tetrahydronaphthyl(1 or 2) radical, are coupled in acid medium with 2-phenylamino-8-hydroxynaphthalene-6-sulfonic acids of the formula

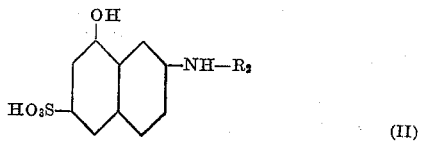

wherein $R_2$ is a phenyl radical which is substituted by one or more halogen atoms, alkyl groups or alkoxy groups, or is a 5,6,7,8-tetrahydronaphthyl(1 or 2) radical.

Illustrative of 1-amino-4-phenoxybenzene-2-sulfonic acids of Formula I which are suitable as diazo components in the preparation of the dyestuffs of the present invention are inter alia:

1-amino-4-phenoxybenzene-2-sulfonic acid,
1-amino-4-(2'2-chloro)-phenoxybenzene-2-sulfonic acid,
1-amino-4-(3'-chloro)-phenoxybenzene-2-sulfonic acid,
1-amino-4-(4'-chloro)-phenoxybenzene-2-sulfonic acid,
1-amino-4-(4'-fluoro)-phenoxybenzene-2-sulfonic acid,
1 - amino - 4-(2',4'-dichloro)-phenoxybenzene-2-sulfonic acid,
1 - amino - 4-(2',5'-dichloro)-phenoxybenzene-2-sulfonic acid,
1-amino-4-(2'-methyl)-phenoxybenzene-2-sulfonic acid,
1-amino-4-(3'-methyl)-phenoxybenzene-2-sulfonic acid,
1-amino-4-(4'-methyl)-phenoxybenzene-2-sulfonic acid,
1-amino-4-(2'-ethyl)-phenoxybenzene-2-sulfonic acid,
1-amino-4-(3'-ethyl)-phenoxybenzene-2-sulfonic acid,
1-amino-4-(4'-ethyl)-phenoxybenzene-2-sulfonic acid,
1 - amino - 4-(2',3'-dimethyl)-phenoxybenzene-2-sulfonic acid,
1 - amino - 4-(2',4'-dimethyl)-phenoxybenzene-2-sulfonic acid,
1 - amino - 4-(2',5'-dimethyl)-phenoxybenzene-2-sulfonic acid,
1 - amino - 4-(2',6'-dimethyl)-phenoxybenzene-2-sulfonic acid,
1 - amino - 4-(3',4'-dimethyl)-phenoxybenzene-2-sulfonic acid,
1 - amino - 4-(3',5'-dimethyl)-phenoxybenzene-2-sulfonic acid,
1 - amino-4-(3'-chloro-4'-methyl)-phenoxybenzene-2-sulfonic acid,
1 - amino - 4-(2'-methoxy-5'-methyl)-phenoxybenzene-2-sulfonic acid,
1-amino-4-(2',4',5'-trimethyl)-phenoxybenzene-2-sulfonic acid,
1-amino-4-(2',4',6'-trimethyl)-phenoxybenzene-2-sulfonic acid,
1-amino-4-(4'-isopropyl)-phenoxybenzene-2-sulfonic acid,
1-amino-4-(4'-tert. butyl)-phenoxybenzene-2-sulfonic acid,
1-amino-4-(4'-iso-octyl)-phenoxybenzene-2-sulfonic acid,
1 - amino - 4-(4'-cyclohexyl)-phenoxybenzene-2-sulfonic acid,
1-amino-4-(4'-benzyl)-phenoxybenzene-2-sulfonic acid,
1-amino-4-(4'-phenyl)-phenoxybenzene-2-sulfonic acid,
1-amino-4-(3'-methoxy)-phenoxybenzene-2-sulfonic acid,
1 - amino-4-(4'-methoxy)-phenoxybenzene-2-sulfonic acid,
1-amino-4-(3'-ethoxy)-phenoxybenzene-2-sulfonic acid,
1-amino-4-(4'-ethoxy)-phenoxybenzene-2-sulfonic acid,
1 - amino-4-(5',6',7',8'-tetrahydro)-naphthyl(1')-oxybenzene-2-sulfonic acid,
1 - amino-4-(5',6',7',8'-tetrahydro)-naphthyl(2')-oxybenzene-2-sulfonic acid, etc.

The aforesaid 1-amino-4-phenoxybenzene-2-sulfonic acids (I) can be prepared from the corresponding 1-amino-4-phenoxybenzenes, advantageously by heating the acid sulfates thereof to high temperatures.

Illustrative of the 2-phenylamino-8-hydroxynaphthalene-6-sulfonic acids of Formula II which are suitable as azo components in the preparation of the dyestuffs of the present invention are inter alia:

2-(2',6'-dimethyl)-phenylamino-8-hydroxynaphthalene-6-sulfonic acid,
2 - (2',3',4',6'-tetramethyl)-phenylamino-8-hydroxynaphthalene-6-sulfonic acid,
2 - (2',6'-dimethyl-4'-methoxy)-phenylamino-8-hydroxynaphthalene-6-sulfonic acid,
2 - (2',4',6'-trimethyl)-phenylamino-8-hydroxynaphthalene-6-sulfonic acid, etc., the latter being the preferred azo component.

The coupling of the diazo compounds with the 2-phenylamino-8-hydroxynaphthalene-6-sulfonic acids of formula (II) is carried out in acid medium; coupling takes place at the 1-position of the azo component. To this end, the cold hydrochloric acid suspension of the diazo compound is combined, in the presence of an alkali metal acetate, with the aqueous solution of the 2-phenylamino-8-hydroxynaphthalene-6-sulfonic acid (II) which preferably is at room temperature (about 15° to about 30° C.). The coupling mass is stirred for some time at room temperature after which the formed monoazo dyestuff is filtered off, if necessary after the addition of sodium chloride to the coupling mass, and then the filtered dyestuff is purified—if necessary by reprecipitation from hot water—and dried.

The new acid monoazo dyestuffs thus prepared according to this invention correspond to the formula

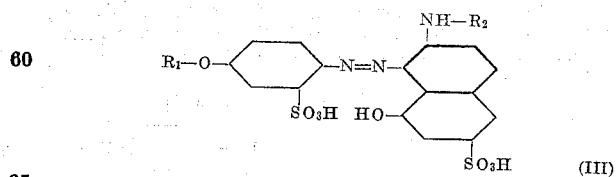

wherein $R_1$ and $R_2$ have the previously-indicated significances. They are red powders which dissolve with red coloration in water and which dye wool, silk and synthetic polyamide fibers such e. g. as nylon from a neutral to weakly acid bath in bluish red shades. The dyeings possess good to very good fastness to light and good to very good fastness to washing, perspiration, alkaline fulling and acid fulling. The monoazo dyestuffs prepared from the diazo components according to the invention and 2-(2',4',6'-trimethyl)phenylamino - 8 - hydroxynaphthalene - 6 - sulfonic acid are further distinguished by the remarkable purity of their dyeings.

The following examples set forth representative embodiments of the invention, these being entirely illustrative and not at all limitative. In these examples, the parts and percentages are by weight; the temperatures are in degrees centigrade.

EXAMPLE 1

33.4 parts of 1-amino-4-(2',4'-dichloro)-phenoxybenzene-2-sulfonic acid are dissolved in 300 parts of water with the addition of sodium hydroxide in the form of sodium salt. After admixture thereof with 40 parts of aqueous sodium nitrite solution of 20% strength, the resultant solution is run into a well-stirred mixture of 40 parts of concentrated sulfuric acid, 200 parts of water and 100 parts of finely crushed ice. After stirring the mass for one hour at 5–10°, the diazo compound which separates out is filtered off and stirred into the form of a pulp with 200 parts of ice water. The thus-produced suspension is then combined, while stirring thoroughly, with a solution, at 15–20°, of 36 parts of 2-(2',4',6'-trimethyl)-phenylamino-8-hydroxynaphthalene - 6 - sulfonic acid in 400 parts of water and 30 parts of crystalline sodium acetate. After stirring this coupling mass for three hours, the monoazo dyestuff which is produced is salted out with 50 parts of sodium chloride, and then filtered off and dried. It corresponds to the formula

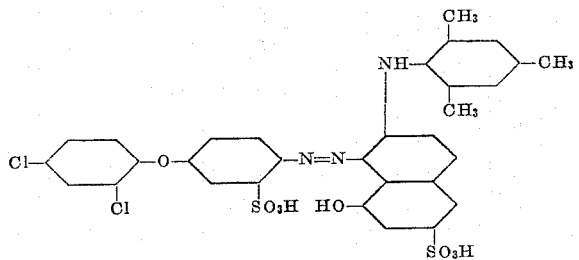

and is a red powder which dissolves with bluish-red coloration in warm water, and dyes wool, silk and synthetic polyamide fibers from a weakly acid bath in pure bluish-red shades of very good fastness to light and good fastness to washing, perspiration and fulling.

EXAMPLE 2

37.7 parts of 1-amino-4-(4'-iso-octyl)-phenoxybenzene-2-sulfonic acid are indirectly diazotized according to the procedure set forth in Example 1. The precipitated diazo compound is filtered off and stirred together with 350 parts of ice water. The resultant suspension is admixed, while stirring thoroughly, with a solution—having a temperature of 10–15°—of 36 parts of 2-(2',4',6'-trimethyl) - phenylamino-8-hydroxynaphthalene-6-sulfonic acid in 600 parts of water and 35 parts of crystalline sodium acetate. After stirring the coupling mass for about four hours, the precipitated monoazo dyestuff is filtered off, if desired purified by reprecipitation from hot water, and then dried. It corresponds to the formula

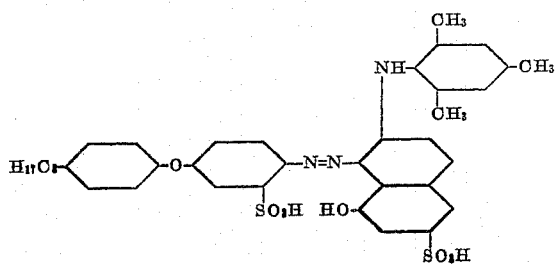

and is a red powder which readily dissolves with bluish-red coloration in hot water and which dyes wool, silk and synthetic polyamide fibers from a neutral bath in pure bluish-red shades of very good fastness to light and very good fastness to washing, perspiration and fulling.

The following table sets forth additional examples of monoazo dyestuffs according to the present invention, which can be prepared after the manner described in the foregoing examples. Column 1 of the table sets forth the number of the examples, while column 2 sets forth the 1-amino-4-phenoxybenzenes of Formula I, and column 3 sets forth the 2-phenylamino-8-hydroxynaphthalene-6-sulfonic acids of Formula II involved in making the corresponding acid monoazo dyestuffs according to the present invention. These dyestuffs yield, in each of the examples, dyeings which are bluish-red in color.

Table

| (1) | (2) | (3) |
|---|---|---|
| 3 | 1-amino-4-phenoxybenzene-2-sulfonic acid. | 2-(4'-methyl)-phenylamino-8-hydroxynaphthalene-6-sulfonic acid. |
| 4 | ___do___ | 2-(4'-methoxy)-phenylamino-8-hydroxynaphthalene-6-sulfonic acid. |
| 5 | ___do___ | 2-(2',4'-dimethyl)-phenylamino-8-hydroxynaphthalene-6-sulfonic acid. |
| 6 | ___do___ | 2-(2',5'-dimethyl)-phenylamino-8-hydroxynaphthalene-6-sulfonic acid. |
| 7 | ___do___ | 2-(2',6'-dimethyl)-phenylamino-8-hydroxynaphthalene-6-sulfonic acid. |
| 8 | ___do___ | 2-(2',5'-diethoxy)-phenylamino-8-hydroxynaphthalene-6-sulfonic acid. |
| 9 | ___do___ | 2-(4'-chloro)-phenylamino-8-hydroxynaphthalene-6-sulfonic acid. |
| 10 | ___do___ | 2-(5',6',7',8'-tetrahydro)-naphthyl(1')-amino-8-hydroxynaphthalene-6-sulfonic acid. |
| 11 | ___do___ | 2-(5',6',7',8'-tetrahydro)-naphthyl(2')-amino-8-hydroxynaphthalene-6-sulfonic acid. |
| 12 | 1-amino-4-(2',4'-dichloro)-phenoxybenzene-2-sulfonic acid. | 2-(4'-methyl)-phenylamino-8-hydroxynaphthalene-6-sulfonic acid. |
| 13 | 1-amino-4-(2',4',5'-trichloro)-phenoxybenzene-2-sulfonic acid. | Do. |
| 14 | 1-amino-4-(4'-iso-octyl)-phenoxybenzene-2-sulfonic acid. | Do. |
| 15 | 1-amino-4-(4'-phenyl)-phenoxybenzene-2-sulfonic acid. | Do. |
| 16 | ___do___ | 2-(2',4',6'-trimethyl)-phenylamino-8-hydroxynaphthalene-6-sulfonic acid. |
| 17 | 1-amino-4-(4'-benzyl)-phenoxybenzene-2-sulfonic acid. | Do. |
| 18 | 1-amino-4-(4'-tert. amyl)-phenoxybenzene-2-sulfonic acid. | Do. |
| 19 | 1-amino-4-(4'-cyclohexyl)-phenoxybenzene-2-sulfonic acid. | Do. |
| 20 | 1-amino-4-(2',4'-dimethyl)-phenoxybenzene-2-sulfonic acid. | 2-(2',3',4',6'-tetramethyl)-phenylamino-8-hydroxynaphthalene-6-sulfonic acid. |
| 21 | 1-amino-4-(2'-methoxy-5'-methyl)-phenoxybenzene-2-sulfonic acid. | 2-(3'-chloro)-phenylamino-8-hydroxynaphthalene-6-sulfonic acid. |
| 22 | 1-amino-4-(5',6',7',8'-tetrahydro)-naphthyl(2')-oxybenzene-2-sulfonic acid. | 2-(2',6'-dimethyl)-phenylamino-8-hydroxynaphthalene-6-sulfonic acid. |
| 23 | 1-amino-4-(2',5'-diethoxy)-phenoxybenzene-2-sulfonic acid. | 2-(2',4',6'-trimethyl)-phenylamino-8-hydroxynaphthalene-6-sulfonic acid. |
| 24 | 1-amino-4-(3'-fluoro)-phenoxybenzene-2-sulfonic acid. | Do. |
| 25 | 1-amino-4-phenoxybenzene-2-sulfonic acid. | 2-(4'-fluoro)-phenylamino-8-hydroxynaphthalene-6-sulfonic acid. |

Representative of the monoazo dyestuffs of the foregoing table are those of Examples 16, 18 and 19, the formulae of which are respectively as follows:

EXAMPLE 16

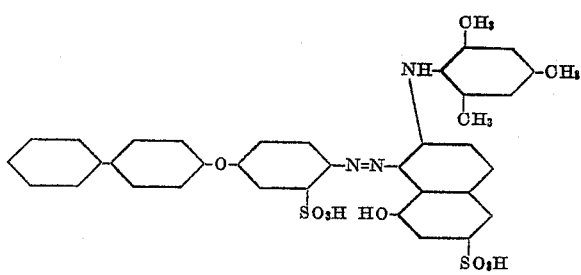

EXAMPLE 18

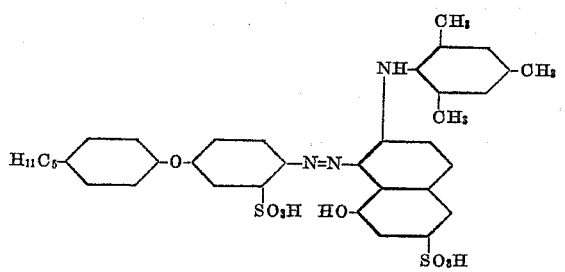

EXAMPLE 19

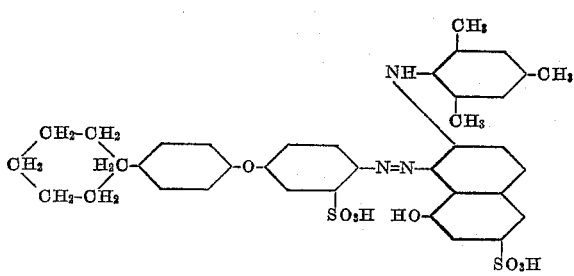

EXAMPLE 26

100 parts of wool are entered into a dyebath containing 1 part of the dyestuff obtainable according to Example 1, 10 parts of sodium sulfate, 2 parts of acetic acid and 8000 parts of water, at 40–50°. The bath is heated to boiling, kept at boiling temperature for 30 minutes, and then cooled to about 70° whereupon an additional 2 parts of acetic acid are added. The bath is then again heated to boiling for 30 minutes. The wool is withdrawn, rinsed and dried; it is dyed in a fast, pure bluish-red shade.

Synthetic polyamide fibers and silk are dyed in analogous manner, although in the case of the latter the bath is not heated to boiling but only to 90°–95°.

Having thus disclosed the invention, what is claimed is:

1. An acid monoazo dyestuff which corresponds to the formula

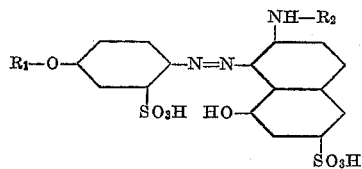

wherein $R_1$ stands for a member selected from the group consisting of phenyl, fluorophenyl, chlorophenyl, lower alkylphenyl, cyclo-alkylphenyl, aralkylphenyl, lower alkoxyphenyl, lower alkyl-alkoxyphenyl, diphenyl and 5,6,7,8-tetrahydronaphthyl, and $R_2$ stands for a member selected from the group consisting of fluorophenyl, chlorophenyl, methylphenyl, lower alkoxyphenyl and 5,6,7,8-tetrahydronaphthyl.

2. An acid monoazo dyestuff which corresponds to the formula

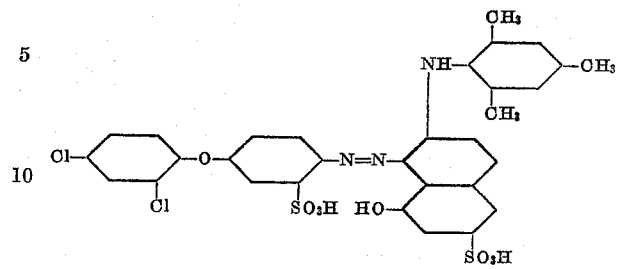

3. An acid monoazo dyestuff which corresponds to the formula

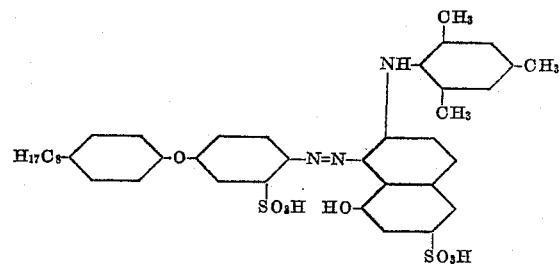

4. An acid monoazo dyestuff which corresponds to the formula

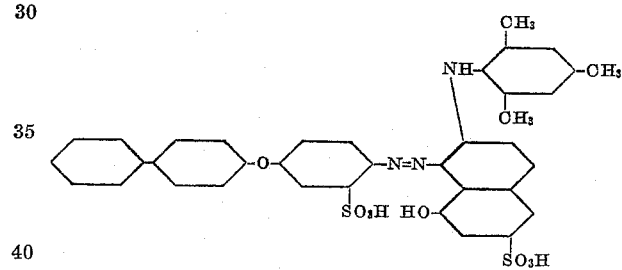

5. An acid monoazo dyestuff which corresponds to the formula

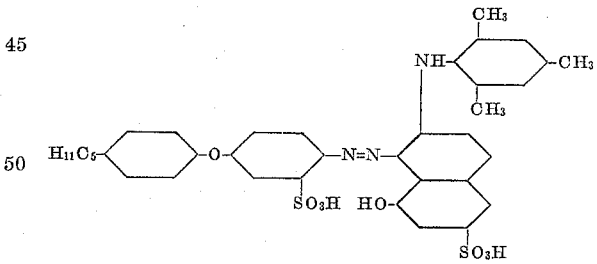

6. An acid monazo dyestuff which corresponds to the formula

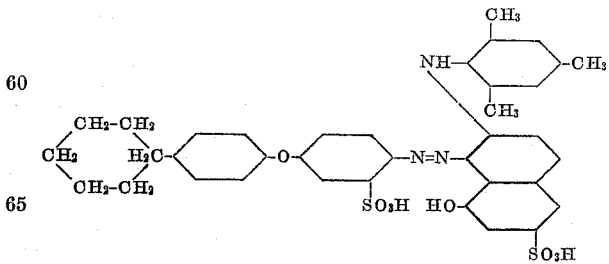

References Cited in the file of this patent

UNITED STATES PATENTS

| | | |
|---|---|---|
| 2,132,560 | Felix et al. | Oct. 11, 1938 |
| 2,150,787 | Schultis et al. | Mar. 14, 1939 |

FOREIGN PATENTS

| | | |
|---|---|---|
| 424,355 | Great Britain | Feb. 20, 1935 |